United States Patent [19]
Eschenbach

[11] Patent Number: 6,124,825
[45] Date of Patent: *Sep. 26, 2000

[54] GPS BASED AUGMENTED REALITY COLLISION AVOIDANCE SYSTEM

[75] Inventor: Ralph Eschenbach, Woodside, Calif.

[73] Assignee: Trimble Navigation Limited, Sunnyvale, Calif.

[ * ] Notice: This patent is subject to a terminal disclaimer.

[21] Appl. No.: 09/293,514

[22] Filed: Apr. 15, 1999

Related U.S. Application Data

[63] Continuation of application No. 08/897,663, Jul. 21, 1997.

[51] Int. Cl.$^7$ .............................. H04B 7/185; G01S 13/00; G08G 5/04
[52] U.S. Cl. ...................... 342/357.08; 342/29; 701/213; 340/961
[58] Field of Search ......................... 342/357.08, 357.14, 342/29, 30; 701/213; 346/961

[56] References Cited

U.S. PATENT DOCUMENTS

| | | | |
|---|---|---|---|
| 5,153,886 | 10/1992 | Fraughton et al. | 364/461 |
| 5,296,861 | 3/1994 | Knight | 342/357 |
| 5,313,201 | 5/1994 | Ryan | 340/961 |
| 5,566,073 | 10/1996 | Margolin | 364/449 |
| 5,666,111 | 9/1997 | Servat et al. | 340/980 |
| 5,714,948 | 2/1998 | Farmakis et al. | 340/961 |
| 5,745,054 | 4/1998 | Wilkens | 340/972 |
| 5,745,863 | 4/1998 | Uhlenhop et al. | 701/14 |

*Primary Examiner*—Mark Hellner
*Attorney, Agent, or Firm*—Wagner, Murabito & Hao LLP

[57] ABSTRACT

The present invention comprises a global positioning system (GPS) based augmented reality (AR) aircraft collision avoidance system. The system of the present invention includes a GPS receiver for receiving GPS signals and determining a present position using the GPS signals. The system of the present invention also includes an automatic dependent surveillance (ADS-B) receiver for receiving an ADS-B signal from an aircraft. The system of the present invention further includes an AR visor coupled to both the GPS receiver and the ADS-B receiver. The AR visor receives the present position from the GPS receiver and receives the ADS-B signal from the ADS-B receiver. Using the present position and the ADS-B signal, the AR visor determines a three dimensional bearing to the aircraft. The AR visor is adapted to be worn by a user. The AR visor is further adapted to display symbology indicating the three dimensional bearing such that the user is made intuitively aware of the three dimensional bearing via the symbology displayed in the AR visor.

29 Claims, 15 Drawing Sheets

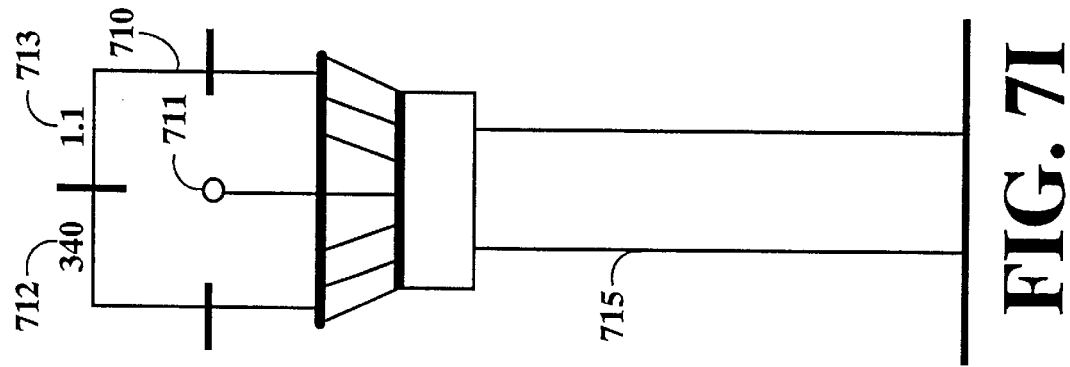
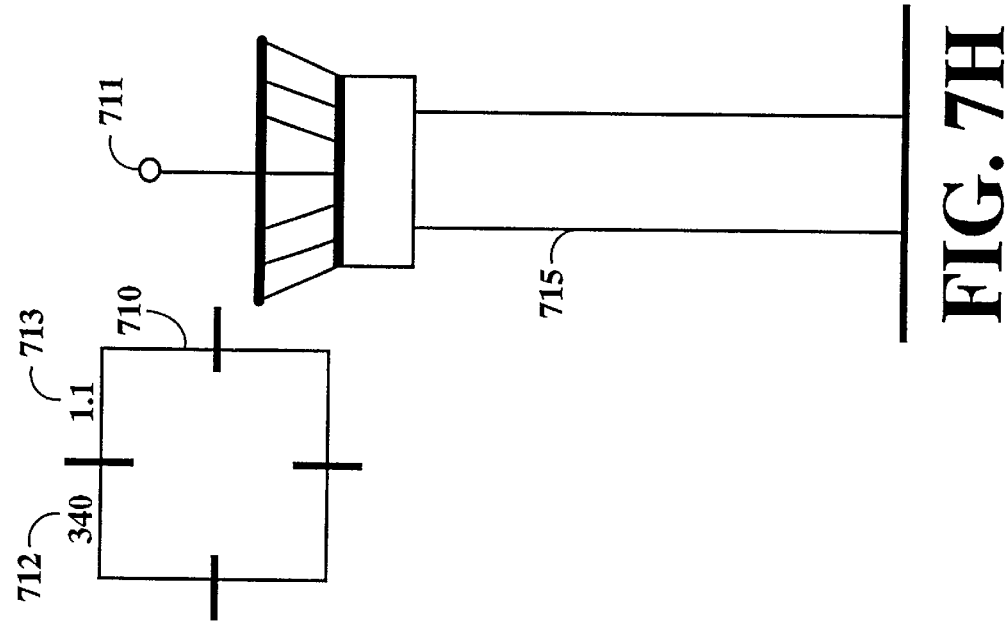
FIG. 7I
FIG. 7H

GPS BASED AUGMENTED REALITY COLLISION AVOIDANCE SYSTEM

This is a continuation of copending application Ser. No. 08/897,663 filed on Jul. 21, 1997 which is hereby incorporated by reference to this specification.

TECHNICAL FIELD

The present invention relates generally to the field of aircraft collision avoidance and navigation systems. More particularly, the present invention relates to an augmented reality aircraft collision avoidance system based upon the Navstar Global Positioning System (GPS).

BACKGROUND ART

Air travel and air commerce have become virtually indispensable to the economies of the industrialized nations. Many different facets of business, industry, government, and the overall public depend upon goods and services delivered via aircraft. Air transportation has become as common and ubiquitous to the modern world as the rail roads of many decades past. Reflecting their importance to modern commerce, the Federal Aviation Administration (FAA) recently estimated that by the year 1990, there were approximately 265,000 registered general aviation aircraft in the United States alone. In addition to general aviation aircraft, there were approximately 6000 commercial carrier aircraft in use as well. These aircraft made use of 17,500 airports, of which 5200 were in public use. The aviation industry plays an enormous and indispensable role in the national economy and interstate commerce. As such, the safe and efficient use of the national airspace plays an equally important role.

Ensuring the safe and efficient use of the national airspace is a primary objective of the FAA. The FAA is the authority tasked by the government of the United States with promoting the safe, orderly, and expeditious flow of air traffic. As such, the FAA maintains an Air Traffic Control (ATC) organization and system which operates and regulates the national airspace system. ATC system accomplishes many functions in the course of operating and regulating the national airspace system. Such functions include the organization of airspace into routes for departures, en route airways, and arrivals, the maintenance of radio navigation aids, and the like. A primary function ATC provides is air traffic deconfliction and collision avoidance.

With reference now to Prior Art FIG. 1, a diagram 100 of the scheme of operation of the present ATC system is shown. Prior Art FIG. 1 shows an ATC enroute air traffic control center 101, commonly referred to as an ATC center. The ATC center 101 is coupled to a radar system 102. Radar system 102 sweeps a radar beam 103 in a circular pattern in order to detect and track the various aircraft 104–108 enroute through the airspace above.

As is well known, the ATC center 101 contains display systems, computers, and various automation systems, along with air traffic control personnel (e.g., controllers) who are responsible for providing ATC services. ATC center 101 also includes various communication systems which provide ATC voice and data communications interfaces to aircraft 104–108. ATC center 101 utilizes the surveillance data gathered by radar system 102 to obtain the location and heading information regarding the aircraft 104–108. The ATC center 101 is typically linked to radar system 102 via the standard terrestrial telecommunications network.

Radar system 102 sweeps the surrounding airspace with a wide "surveillance beam" of radar energy. The radar beam 103 is emitted from a rotating radar antenna, typically at either 1300 or 2800 MHz, and reflects off of the metal skin of the aircraft within its beam width (e.g., aircraft 105). The various radar reflections and the corresponding azimuths of the radar antenna, as is well known, together provide the range, azimuth, and elevation of the various aircraft within the area swept by the radar beam (i.e., the surveillance volume). By observing the locations of aircraft 105–108 over successive sweeps, the various headings and speeds of aircraft 105–108 can be determined.

Air traffic controllers in ATC center 101 utilize the information provided by radar system 102 to deconflict the flight paths of the various aircraft within the surveillance volume and ensure a safe amount of separation. For example as aircraft 105 flies through the airspace monitored by ATC center 101, ATC center 101 monitors the progress of aircraft 105 and all nearby aircraft to ensure safe separation. Aircraft 105 is in communications contact with ATC center 102 and responds to voice commands from the air traffic controllers to alter course or altitude should the need arise. Hence, to ensure safe air navigation through its monitored surveillance volume, ATC center 101 is required to track the present position and heading of all aircraft within the surveillance volume and each aircraft consequently needs to remain in communications contact with ATC center 101. In addition to relying upon ATC center 101 to ensure safe separation, each individual aircraft (e.g., aircraft 105) is ultimately responsible for maintaining safe separation through visual or any other means.

Thus, even though ATC center 101 provides a technical means of ensuring safe separation between aircraft, each individual aircraft must, in essence, keep an eye out for collisions. Consequently, there are two basic types of flights: those under visual flight rules (VFR) and those under instrument flight rules (IFR). In VFR flights, the aircraft pilot is responsible for separation from all other aircraft by maintaining a constant visual scan of the surrounding sky. No flight through clouds are allowed. VFR flights are thus typically conducted on fair weather days. No contact with an ATC center (e.g., ATC center 101) is required. In IFR flights, aircraft must remain in communications contact with an ATC center (e.g., ATC center 101). IFR flight allows aircraft to penetrate clouds or fly at altitudes above 18,000 ft. Commercial aircraft usually fly above 18,000 ft and thus almost always fly under IFR. When an IFR aircraft is flying through clear weather, the individual aircraft is primarily responsible for ensuring safe separation (e.g., through visual means). When the aircraft is flying through clouds however, the aircraft is completely dependent upon an ATC center for collision avoidance. Hence, while flying through clouds or bad weather, (referred to as instrument meteorological conditions, or IMC) there is currently no visual means of ensuring safe separation and collision avoidance.

Hence, where aircraft 104 is a VFR aircraft and aircraft 105–108 are IFR aircraft, ATC center 101 has an absolute requirement to know the whereabouts of IFR aircraft 105–108, and a strong requirement to know the whereabouts of VFR aircraft 104. The resolution of radar system 102, however is limited. Radar system 102 tends to have relatively good range and azimuth resolution. The elevation resolution, however, is very limited. Radar system 102 cannot accurately determine the altitudes of the aircraft within the surveillance area. As such, each aircraft within the surveillance volume must individually report their altitude to the air traffic controllers of ATC center 101. Additionally, at different times there may be aircraft within the surveillance volume which are not within radar beam 103 as it sweeps around radar system 102 (e.g., aircraft 104), or are otherwise within an area masked from radar system 102 (e.g., masked due to mountainous terrain). These and other such problems have lead to the use of various forms of automatic dependent surveillance systems.

Automatic dependent surveillance (ADS) systems are widely known in the aviation industry (the most common examples being mode 3A and mode C transponder systems). ADS refers to the fact that the surveillance depends upon an aircraft determined position fix from equipment onboard the aircraft. The aircraft determined position is communicated to an ATC center using automated datalink technology. Using the aircraft determined positions, air traffic controllers monitor the progress of aircraft within their surveillance volume, ensure safe separation, and otherwise control air traffic. As ADS systems become more sophisticated and incorporate modern integrated circuit technology, together with the emergence of global positioning system (GPS) satellite based navigation technology, a fully automated world wide aircraft surveillance and collision avoidance system becomes possible.

A GPS based ADS system would include the automatic broadcast of each aircraft's position in a standardized manner on standardized frequencies using standardized data formats. Such a system is often referred to as an ADS-B system, or automatic dependent surveillance broadcast system. The automatic broadcasts would in turn allow any properly equipped aircraft to know the position and heading of all neighboring aircraft. Each aircraft would utilize GPS technology to determine its position and heading. The position and heading would then be transmitted to other ADS-B equipped aircraft. The ADS-B signals would be transmitted using standard transponder technology already present in many aircraft (e.g., mode S). In such an ADS-B system, the transponders aboard each aircraft would respond to interrogation from ground based radar systems (e.g., radar system 102) as they currently do, and also spontaneously transmit the aircraft's GPS determined present position periodically. This process is often referred to as GPS squitter. Each aircraft in the vicinity would receive the GPS squitter and track the position and progress of neighboring aircraft, thus implementing a GPS squitter Traffic Alert and Collision Avoidance System (TCAS).

It should be noted that there have been several studies and publications describing and discussing the use of GPS based ADS-B systems to augment or possibly even replace the radar based surveillance system currently in use in the United States. GPS based ADS-B promises many advantages over the current system. Those desiring additional discussion of GPS based ADS-B and GPS squitter systems should consult "Ronald Braff, J. David Powell, Joseph Dorfler, APPLICATIONS OF THE GPS TO AIR TRAFFIC CONTROL, Global Positioning System: Theory and Applications, Volume II, ISBN 1-56347-107-8", which is incorporated herein as background material. Additionally, those desiring a more detailed discussion of GPS and general aviation should consult "Ralph Eschenbach, GPS APPLICATIONS IN GENERAL AVIATION, Global Positioning System: Theory and Applications, Volume II, ISBN 1-56347-107-8", which is also incorporated herein as background material.

Because GPS squitter TCAS is not dependent upon ground based radar surveillance, the associated terrain masking and radar resolution problems are eliminated. Modern aircraft cockpit avionics often incorporate multi-function display screens capable of conveying a variety of information to the flight crew. GPS quitter TCAS would enable the display of aircraft in the vicinity and allow the aircrew to ensure safe separation even while flying in IMC.

However, many problems remain. Visually scanning the flight path and the surrounding airspace remains the most intuitive means of ensuring safe separation from neighboring aircraft. While flying in IMC, visual means of collision avoidance remain ineffective. Modern cockpit avionics, while capable of efficiently displaying a wide variety of information to the aircrew, are still display based, in that their information is conveyed visually, in a head down manner. To receive the information, the aircrew needs to look down, into the cockpit, at the display, as opposed to looking out of the aircraft in the direction of flight.

In addition, although the GPS squitter information can be readily displayed using the avionics, the instrument display is inherently 2 dimensional (2D) in nature. Neighboring aircraft are typically presented on the instrument display screen using 2D alphanumeric symbology. This requires the aircrew to quickly translate the 2D display symbology into a real world 3 dimensional (3D) range and bearing. The 2D display symbology is translated to a 3D range and bearing, which is utilized for a visual cross check for the real world aircraft represented on the display. The process of looking down into the cockpit at a relatively small 2D instrument display, mentally translating the display symbology into a 3D range and bearing, and looking up at the corresponding range and bearing to find the represented aircraft, is not intuitive. This process leads to the aircrew repeatedly looking down into the cockpit at the display, looking back up outside along the indicated bearing, visually scanning for the aircraft if it isn't immediately seen, looking back down into the cockpit at the display, looking back up and scanning for the represented aircraft, and so on. If the airspace in the immediate vicinity is congested, or if the airspace is partially (or completely) obscured by clouds, the aircrew is soon left depending primarily (if not solely) upon air traffic control personnel to ensure safe separation, regardless of any ADS-B system in use.

Thus, what is required is an aircraft traffic alert and collision avoidance system which has the accuracy and reliability of GPS and is compatible with current flight regimes (e.g., VFR, IFR, and the like). The required system should provide the aircrew with a visual, intuitive means of ensuring aircraft safe separation. The required solution should allow the aircrew to visually cross check air traffic alerts from either GPS squitter avionics or air traffic controller communications. The required solution should be fully functional in differing weather conditions, even in full IMC flight. Additionally, the required solution should be easily interpreted and convey air traffic alert and collision avoidance information while allowing the pilots to remain heads up, visually scanning the airspace outside the cockpit. The system of the present invention provides an elegant solution to the above requirements.

DISCLOSURE OF THE INVENTION

The present invention comprises a global positioning system (GPS) based augmented reality (AR) aircraft collision avoidance system. The present invention provides air traffic alert and collision avoidance system which has the accuracy and reliability of GPS and is compatible with current flight regimes, such as, for example, flying VFR, flying IFR, and the like. The GPS based AR aircraft collision avoidance system of the present invention provides a properly equipped aircrew with a visual and intuitive means of insuring aircraft safe separation. The system of the present invention allows the aircrew to visually cross check air traffic alerts from either GPS squitter avionics or air traffic controller communications. The system of the present invention is fully functional in differing weather conditions, even in IMC flight. The system of the present invention functions intuitively and is easily interpreted even during the busiest portions of flight (e.g., take off or landing in heavily congested airspace). Thus, the present invention allows the aircrew to remain heads up, visually scanning the airspace outside the aircraft cockpit.

In one embodiment, the GPS based AR aircraft collision avoidance system of the present invention includes a GPS receiver for receiving GPS signals and determining a present position using the GPS signals. The system of the present invention also includes an automatic dependent surveillance (ADS-B) receiver for receiving an ADS-B signal from an aircraft. The system of the present invention further includes an AR visor coupled to both the GPS receiver and the ADS-B receiver. The AR visor is adapted to be worn by a user. The AR visor receives the present position from the GPS receiver and receives the ADS-B signal from the ADS-B receiver. Using the present position and the ADS-B signal, the AR visor determines a three dimensional bearing to the aircraft. The AR visor is further adapted to display symbology indicating the three dimensional bearing such that the user is made intuitively aware of the three dimensional bearing via the symbology displayed in the AR visor. The user views his surroundings through the AR visor and any neighboring aircraft are indicated by the AR visor as superimposed computer generated symbols displayed in the user's field of view. In fair weather flight, the symbol appears superimposed over the image of the aircraft. In IMC flight, the symbol accurately indicates the location of the aircraft even though the aircraft is obscured by clouds or otherwise not visible.

BRIEF DESCRIPTION OF THE DRAWINGS

The accompanying drawings, which are incorporated in and form a part of this specification, illustrate embodiments of the invention and, together with the description, serve to explain the principles of the invention:

Prior Art

FIG. 7H shows a first portion of a second registration calibration process in accordance with the present invention.

FIG. 7I shows a second portion of the second registration calibration process from FIG. 7H.

DETAILED DESCRIPTION OF THE INVENTION

Figure 1:
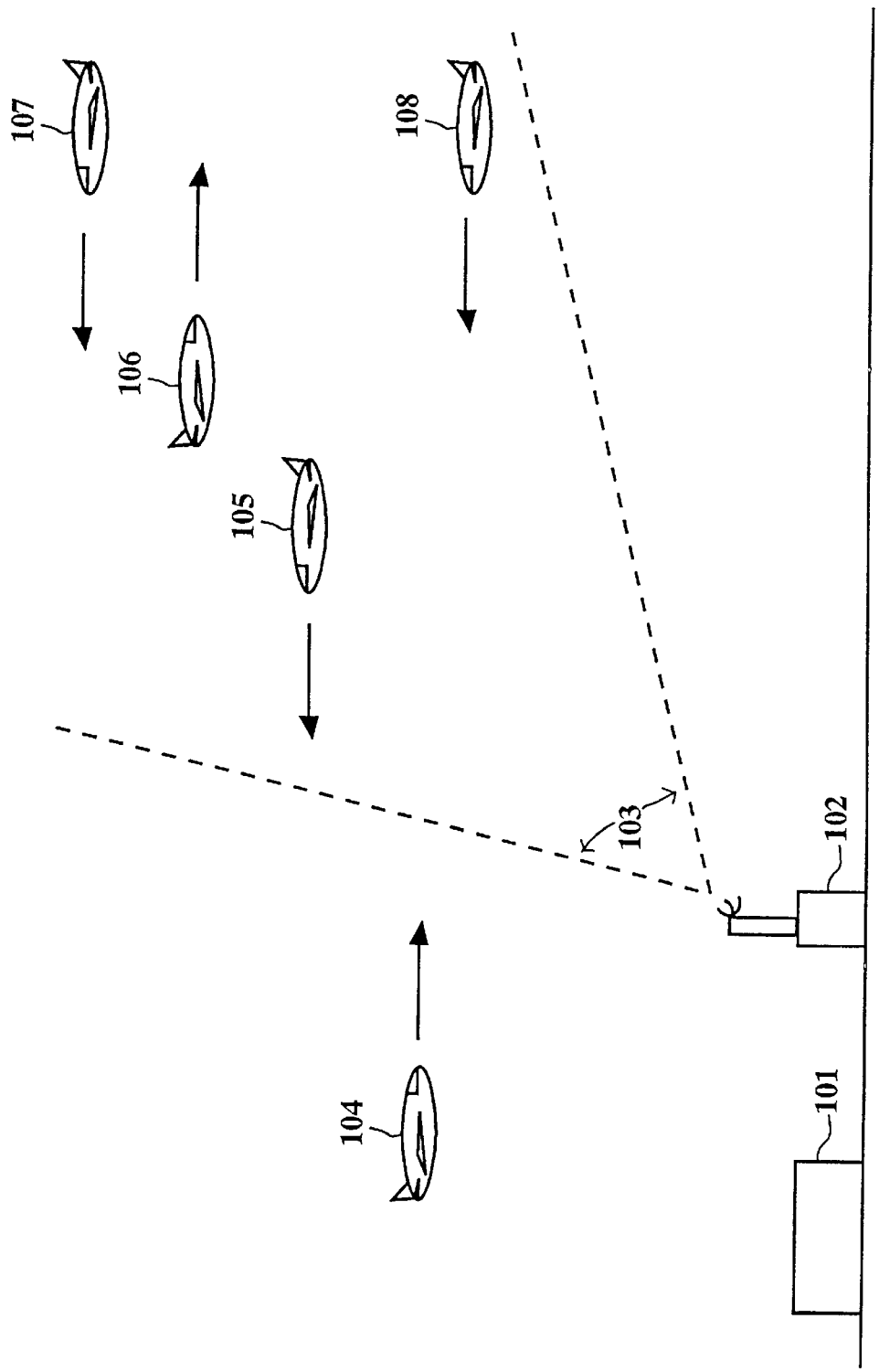
FIG. 1 shows a diagram of the scheme of operation of the ATC system.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention comprises a GPS based AR aircraft collision avoidance system. The system of the present invention provides air traffic alert and collision avoidance by providing the aircrew of an aircraft with an easily utilized intuitive means of visually cross checking traffic alerts from air traffic control personnel or GPS squitter avionics. The system of the present invention functions visually, using easily interpreted visual cues. Information is intuitively conveyed and is easily interpreted, even during the busiest portions of flight. This allows the aircrew to remain heads up, visually scanning the airspace outside the aircraft.

In one embodiment, the system of the present invention includes a GPS receiver and an ADS-B receiver coupled to an AR visor. The AR visor is typically worn by the aircrew (e.g., the pilot and copilot, or simply the pilot for general aviation aircraft) as if it were simply a pair of goggles or flying glasses. The AR visor is adapted to be worn on the head of the user such that the user looks through the visor, as if looking through a pair of goggles. The AR visor is a transparent see-through visor, allowing the user to see his surroundings (e.g., allowing the aircrew to see the instrumentation, the inside of the cockpit, outside the aircraft, and the like). The AR visor allows the system of the present invention to overlay computer generated symbology over the user's view of his surroundings, creating a scene comprised of the user's real world surroundings and augmenting computer generated symbology, thus, the term "augmented reality". The AR visor uses the present position from the GPS receiver and the ADS-B signal from the ADS-B receiver to determine a three dimensional bearing to a neighboring aircraft. This three dimensional bearing is conveyed to the user as computer generated symbology overlaying the real world view of the neighboring aircraft such that the user is immediately visually aware of the three dimensional bearing. Among other benefits, the system of the present invention is fully functional in differing weather conditions, even in IMC. The system of the present invention, and its benefits, are described in greater detail below.

Figure 2:
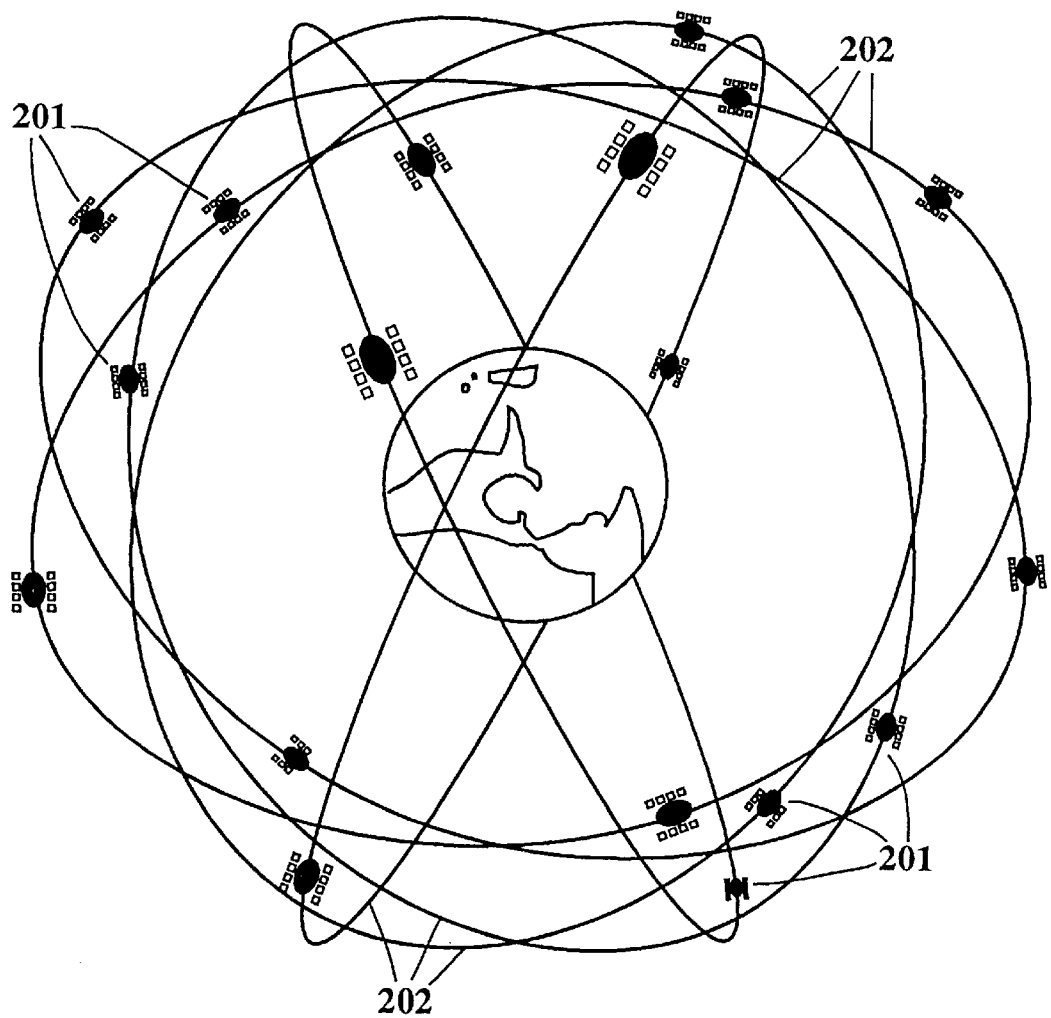
FIG. 2 shows a diagram of the GPS constellation used by the system of the present invention.

With reference now to FIG. 2, a diagram of the GPS constellation 206 used by the system of the present invention is shown. FIG. 2 shows the constellation 206 of GPS satellites in orbit. GPS is a well known and widely used space based radio positioning network for providing users equipped with suitable receivers highly accurate position, velocity, and time (PVT) information. Developed by the United States Department of Defense (DOD), the space based portion of GPS comprises a constellation of GPS satellites in non-geosynchronous 12 hour orbits around the earth. The GPS satellites 201 are located in six orbital planes 202 with four of the GPS satellites 201 in each plane, plus a number of "on orbit" spare satellites (not shown) for redundancy. The orbital planes 202 of the GPS satellites 201 have an inclination of 55 degrees relative to the equator and an altitude of approximately 20,200 km (10,900 miles) and typically complete an orbit in approximately 12 hours. This positions each of the GPS satellites 201 in such a manner that a minimum of five of the GPS satellites 201 are normally observable (above the horizon) by a user anywhere on earth at any given time.

GPS position determination is based upon a concept referred to as time of arrival (TAO) ranging. The orbiting GPS satellites 201 each broadcast spread spectrum microwave signals encoded with positioning data. The signals are broadcast on two frequencies, L1 at 1575.42 MHz and L2 at 1227.60 MHz, with the satellite ephemeris (positioning data in an earth centered, earth fixed, coordinate system) modulated using bi-phase shift keying techniques. Essentially, the signals are broadcast at precisely known times and at precisely known intervals. The signals are encoded with their precise time of transmission. A user receives the signals with a GPS receiver. The GPS receiver (e.g., GPS receiver 304 of FIG. 3) is designed to time the signals and to demodulate the satellite orbital data contained in the signals. Using the orbital data, the GPS receiver determines the time between transmission by the satellite and reception. Multiplying this by the speed of light gives what is termed the pseudo range measurement of that satellite. If the GPS receiver clock were perfect, this would be the range measurement for that satellite, but the imperfection of the clock causes them to differ by the time offset between actual time and receiver time. Thus, the measurement is called a pseudo range, rather than a range. However, the time offset is common to the pseudo range measurements of all the satellites. By determining the pseudo ranges of four or more satellites, the GPS receiver is able to determine its 3D location, as well the time offset. In this manner, the system of the present invention determines the 3D location of the user with great accuracy. Each neighboring aircraft equipped with GPS squitter avionics similarly determines their respective 3D locations and broadcasts them, in the manner described above, enabling the process of the present invention.

Figure 3:
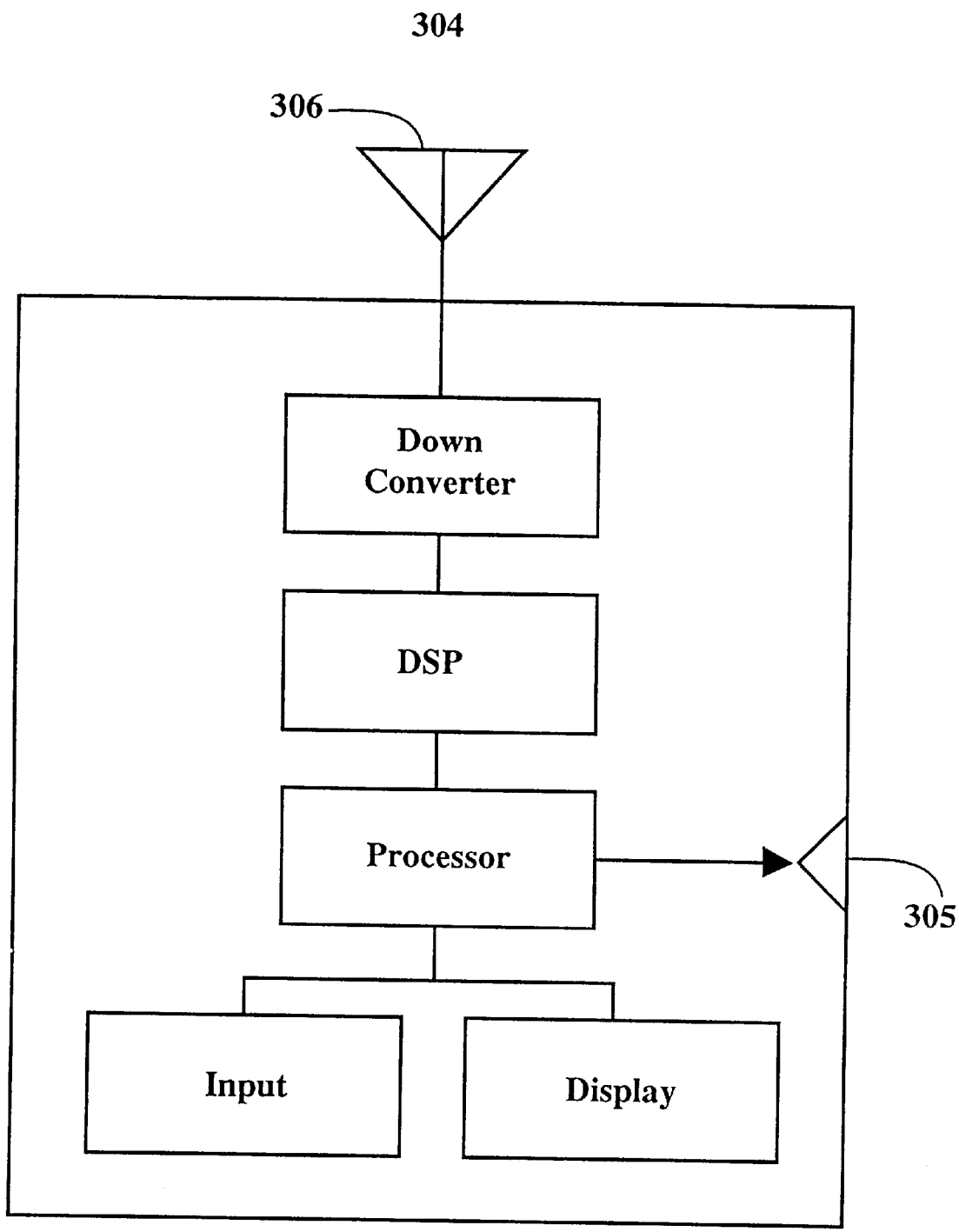
FIG. 3 shows a GPS receiver in accordance with the system of the present invention in greater detail.

With reference now to FIG. 3, a GPS receiver 304 in accordance with one embodiment of the present invention is shown. GPS receiver 304 receives GPS signals from GPS constellation 206 via antenna 306. The GPS signals are down converted then de-spread and demodulated by the digital signal processor (DSP) and passed to an internal processor which computes the correct pseudo ranges and determines the GPS based 3D position. Information can be communicated to the user via an optional display coupled to the processor and built into GPS receiver 304. The GPS receiver can be configured via an optional user input (e.g., a keyboard or joystick). The GPS based 3D position is communicated to processor unit 303 via communications port 305. Additionally, communications port 305 can be one of many well known interface standards in use in the electronics field (e.g., RS-232, ARINC 429, ARINC 629, Milstd 1553, and the like).

Figure 4:
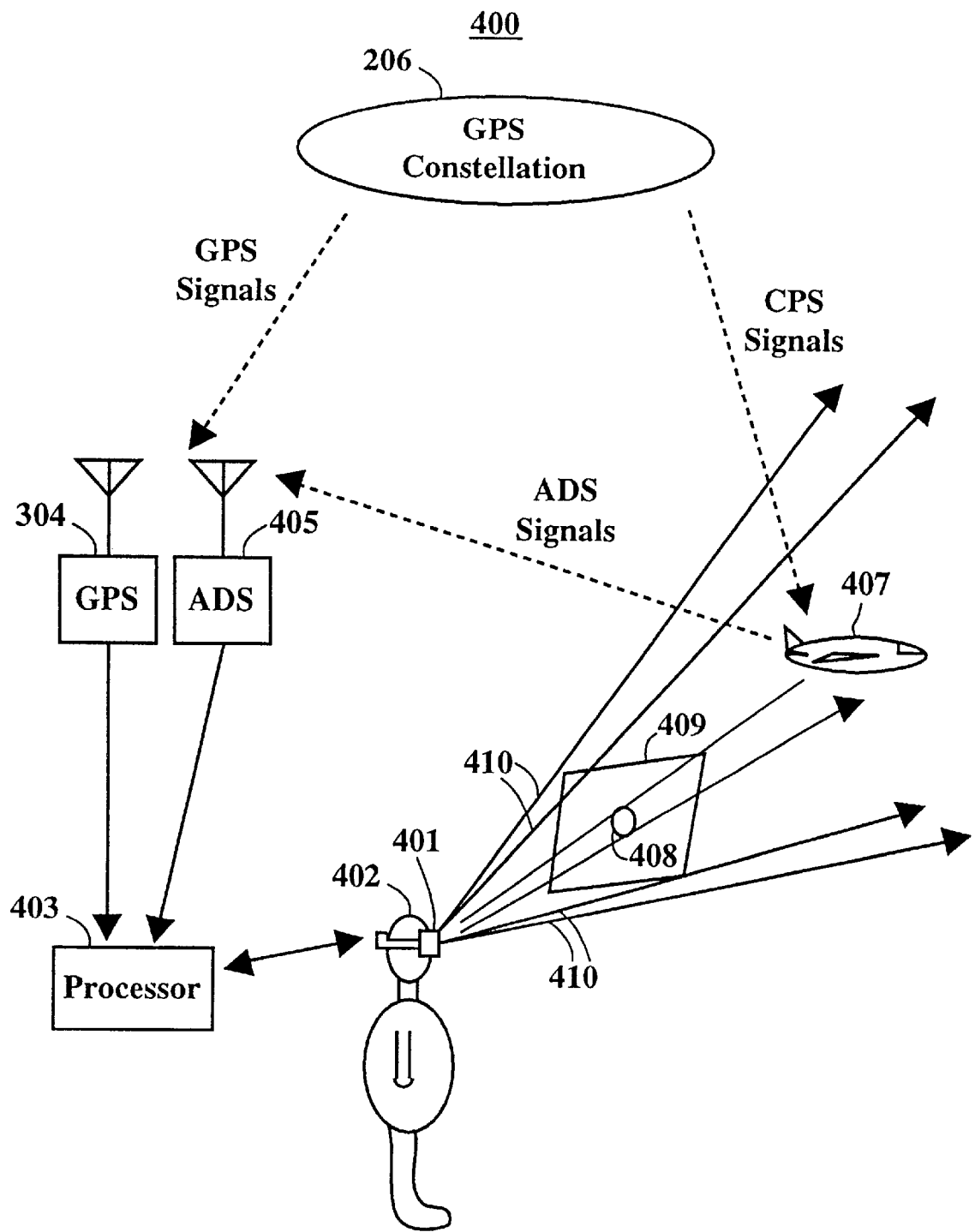
FIG. 4 shows a diagram of the scheme of operation of one embodiment of the GPS based AR aircraft collision avoidance system of the present invention.

FIG. 4 shows a diagram 400 of a general scheme of operation of one embodiment of the GPS based AR aircraft collision avoidance system of the present invention. Diagram 400 shows a GPS based AR aircraft collision avoidance system AR visor 401 being worn by a user 402. AR visor 401 is coupled to a processor unit 403. Processor unit 403 is in turn coupled to a GPS receiver 304 and an ADS-B receiver 405. GPS receiver 304 receives GPS signals from the GPS constellation of satellites 206. ADS-B receiver 405 receives ADS-B signals from a neighboring aircraft 407. The user 402 views a neighboring aircraft 407 through AR visor 401. Computer generated symbology is projected onto the viewing surface of AR visor 401 such that a computer generated symbol 408 appears in the field of view of AR visor 401. For the purposes of illustration, the field of view of AR visor 401 is represented by lines 410 (hereafter referred to simply as field of view 410). The computer generated symbology (e.g., symbol 408) is projected onto a transparent plane of display of AR visor 401 and appears to be at an infinite range to user 402. The plane of display is orthogonal to the viewing aspect of user 402 and represented as display plane 409. User 402 views aircraft 407 through AR visor 401, and thus, through display plane 409. Symbol 408 is projected onto display plane 409 such that symbol 408 is seen as superimposed, or composited, with aircraft 407 as user 402 views aircraft 407 through display plane 409. It should be appreciated that, for the purposes of illustration, field of view 410 and the other elements shown in diagram 400 are not drawn to scale. The AR visor 402, processor unit 403, GPS receiver 304, and ADS-B receiver 405 together comprise one embodiment of the GPS based AR aircraft collision avoidance system of the present invention. Alternatively, in another embodiment, processor unit 403 may be integrated into AR visor 402, as opposed to being a separate device. Additionally, either GPS receiver 304 and/or ADS-B receiver 405 may be integrated into AR visor 402.

Symbol 408 tracks the 3 dimensional bearing (hereafter referred to as bearing) to aircraft 407 from the vantage point of user 402 such that symbol 408 and aircraft 407 continuously appear superimposed to user 402 as aircraft 407 moves across the field of view 410. Similarly, symbol 408 tracks the bearing of aircraft 407 as user 402 alters the field of view 410 by, for example, turning his head to look in a different direction. As field of view 410 changes, and thus as the bearing to aircraft 407 changes, symbol 408 continues to track the bearing of aircraft 407 such that symbol 408 continues to appear superimposed on the image of aircraft 407. Thus, the AR visor 401 augments the field of view of user 402 with information enhancing the situation awareness of user 402, allowing him to more efficiently perform the task at hand (e.g., aircraft collision avoidance).

Aircraft 407 receives GPS signals from GPS constellation 206 and determines its present position therefrom. This present position is broadcast as an ADS-B signal using well known GPS squitter techniques, in the manner described above. These ADS-B signals are available to any ADS-B receiver within range (e.g., ADS-B receiver 405). ADS-B receiver 405 receives the ADS-B signals from aircraft 407 and determines the 3D position transmitted by aircraft 407 (hereafter referred to as the ADS-B position) therefrom. GPS receiver 304 receives GPS signals from GPS constellation 206 and determines the 3D present position of user 402 therefrom. The present position of user 402 and the ADS-B position of aircraft 407 are sent to processor unit 403, where they are utilized by processor unit 403 to determine the bearing to aircraft 407 with respect to user 402. When the bearing to aircraft 407 lies within the field of view 410, AR visor 401 projects symbol 408 onto its display plane 409 such that symbol 408 overlays the image of aircraft 407. Hence, user 402 is immediately and intuitively aware of the bearing to aircraft 407.

It should be appreciated that the system of the present invention can utilize other methods for determining the position of aircraft 407. In addition to the ADS-B method described above, the present invention can be modified to use, for example, a direct radio link to FAA radar, or some form of private service which broadcasts the location of other aircraft. ADS-B receiver 405 would be replaced with an appropriate receiver (e.g., radio link to FAA or private service), and the present invention would function in substantially the same manner. As long as the system of the present invention has accurate information about the location of aircraft 407, the present invention can overlay augmenting symbology on the image of aircraft 407.

Figure 5A:
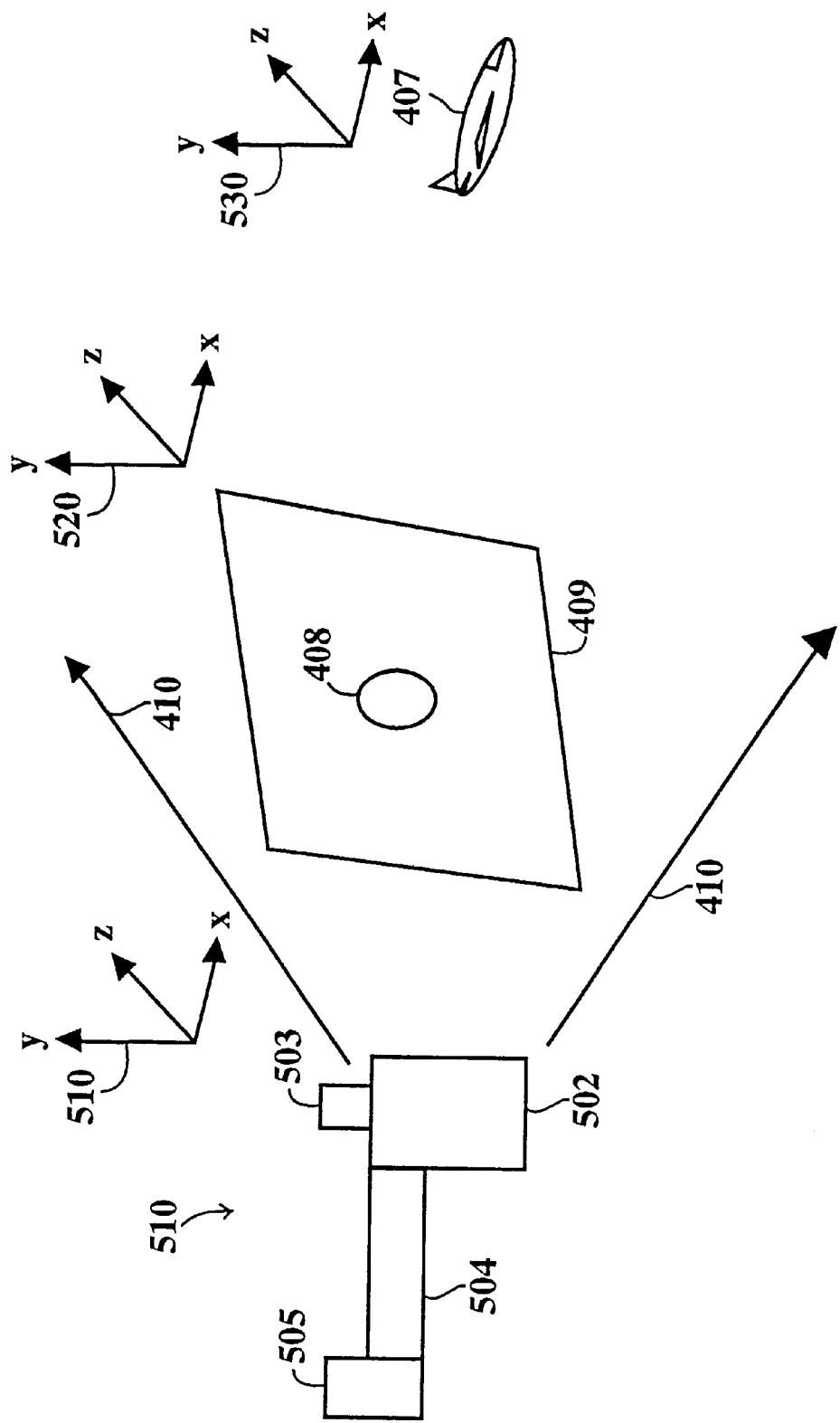
FIG. 5A shows an AR visor in accordance with one embodiment of the present invention in greater detail.

Referring now to FIG. 5A, an AR visor 401 in accordance with one embodiment of the present invention is shown in greater detail. AR visor 401 includes display visor 502 and a coupled image generator 503 for generating and projecting symbology (e.g., symbol 408) onto display visor 502. Display visor 502 is coupled to a head strap 504 (or AR headset 504) adapted to hold AR visor 401 on the head of user 402 (shown in FIG. 4). A position sensor 505 is coupled to AR headset 504 for tracking the 3D position of the display visor 502 as user 402 moves his head. Although in the present embodiment, AR visor 401 is mounted on a headset (e.g., headset 504), the system of the present invention is readily suited to the use of a different head piece to secure AR visor 401 to the head of user 402. Such a head piece could be, for example, a hat, a helmet, or a combined helmet and AR visor. Similarly, position sensor 505 could be mounted on either the head piece (e.g., headset 504) or on AR visor 401, and at any location which does not obstruct the use of the present invention or interfere with user 402 (e.g., on the back of headset 504).

As described above, AR visor 401 augments the user's view of the real world with computer generated symbology, hence giving rise to the term augmented reality. While the field of augmented reality is relatively new, the basic requirements for designing and implementing an effective augmented reality system are well known. These requirements include generating sufficiently high quality artificial images (e.g., computer generated symbol 408), extended range tracking, and registration of the augmenting computer generated images with the real world.

The requirement for generating sufficiently high quality images results from the fact that in augmented reality applications, as in most computer graphics applications, the resolution, brightness, fidelity, and other image attributes can have a large effect on the desired purpose. The higher the quality of image required, the more expensive (e.g., hardware requirements, cost, performance degradation, and the like) generating the image becomes. As can be envisioned, some applications require very high fidelity graphics (e.g., recognizing the face of a computer generated person). The system of the present invention, however, well suited to utilizing relatively simple symbology to convey information. This reduces image generation costs and increases relative performance. The present invention is also well suited to utilizing very high fidelity graphics to generate more complex symbology and images.

The requirement for extended range tracking results from the fact that in order to accurately locate the computer generated symbology, an augmented reality system needs to accurately keep track of the real world objects which are to be augmented. The problem becomes increasingly difficult the farther the real world object is from the user. In order to intuitively and convincingly augment distant real world objects, their location relative to the user needs to be accurately and precisely tracked. The requirement is greater where the real world object is moving, and even more so when both the real world object and the user are moving. Thus, to ensure adequate tracking at varying ranges, the GPS based AR aircraft collision avoidance system of the present invention utilizes ADS-B receiver 405 and GPS receiver 304 (both shown in FIG. 4) to track the position of aircraft 407 and user 402. Hence, in accordance with the present invention, the location of real world objects and the location of the user are tracked using the accuracy of well known and widely utilized GPS technology. Although such position determining technology is used in the present embodiment, the present invention is well suited to obtaining the position of real world objects and the user while using various other positioning determining systems. Such systems include, for example, GLONASS, LORAN, TACAN, and the like.

The requirement for registration between the augmenting computer generated images and the real world results from the fact that the computer generated images need to be correctly aligned with their corresponding real world images. In the GPS based AR aircraft collision avoidance system of the present invention, the location of the symbology in display plane 409 indicates the bearing to aircraft 407. For example, where symbol 408 is a circle, symbol 408 is located in display plane 409 such that aircraft 407 appears within circle 408 as viewed by user 402. Thus, to ensure the symbology projected onto display plane 409 is intuitive and readily comprehensible, it is important that the image of aircraft 407 and symbol 408 remain properly correlated, even in highly dynamic situations (e.g., large head movements by user 402 and large rates of change in the bearing to aircraft 407). The computer generated symbology needs to adequately register with real world objects.

In the present embodiment, the system of the present invention aligns and translates between three separate frames of reference to ensure adequate registration. The first frame of reference comprises the user reference coordinate space 510 (hereafter user frame 510). The user frame 510 is the location and orientation of the user 402 in 3D space. The second frame of reference is the display visor coordinate space 520 (hereafter display frame 520). The display frame 520 is the location and orientation of display plane 409, including the computer generated symbology (e.g., symbol 408) and the field of view 410. The third frame of reference comprises the real world reference coordinate space 530 (hereafter real world frame 530). The real world frame 530 comprises the 3D coordinate space of the real world as referenced by, in the present embodiment, the GPS constellation 206 of FIG. 2.

Accordingly, objects in the real world are located and referenced by their respective real world GPS coordinates in the real world frame. The GPS based AR aircraft collision avoidance system of the present invention is aware of the location of aircraft 407 in real world frame 530 via its respective ADS-B signals. The system of the present invention determines the user's location in user frame 510 via the user's GPS coordinates (from GPS receiver 304) and the user's 3D head orientation (from position sensor 505). Using this information, the system of the present invention determines the proper orientation of display frame 520, and thus, the proper location and orientation of field of view 410, display plane 409, and symbol 408.

Figure 5B:
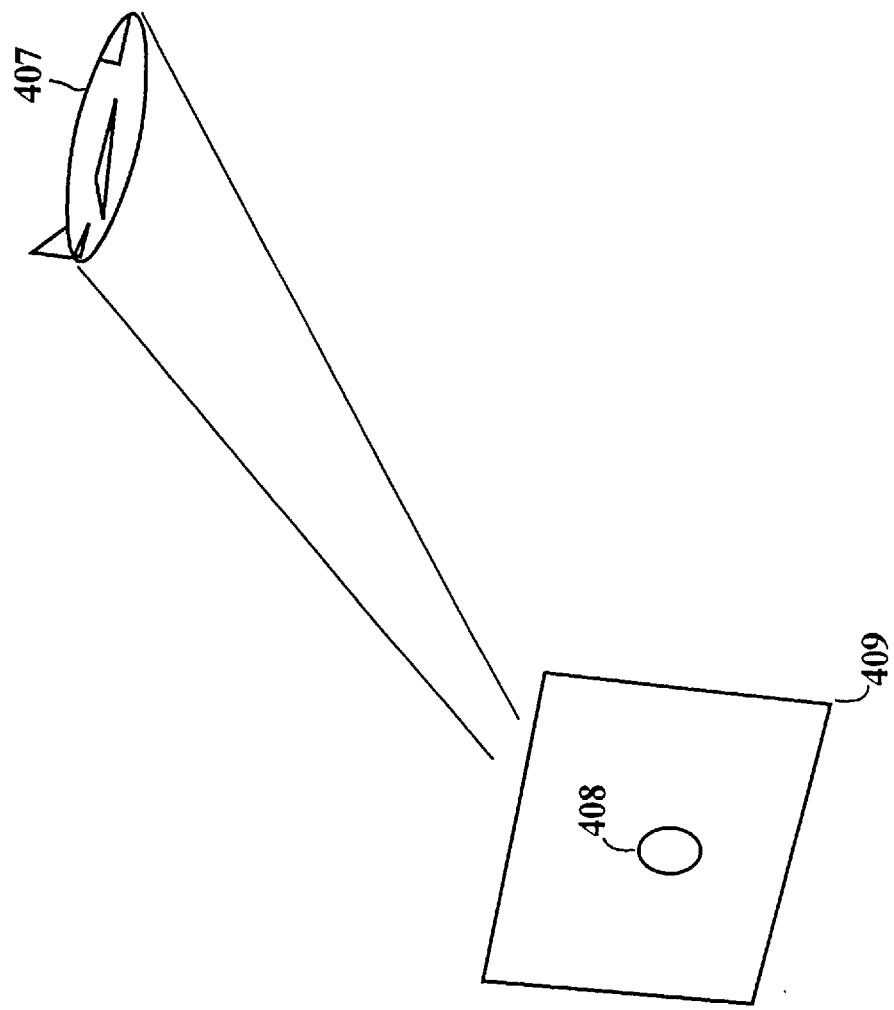
FIG. 5B shows a diagram illustrating the spatial relationship between an aircraft including a user of the present invention and a neighboring aircraft shown.

With reference now to FIG. 5B, a diagram 540 showing the spatial relationship between an aircraft 550 (carrying user 402) and the aircraft 407 is shown. By merely looking in the direction of aircraft 407, user 402 (the pilot of aircraft 550) sees symbol 408 superimposed on the image of aircraft 407. In accordance with the present invention, symbol 408 tracks the bearing of aircraft 407 without regard to the orientation of the head of user 402 and without regard to the relative movement of aircraft 407 and aircraft 550. As long as user 402 keeps aircraft 407 within his field of view (e.g., field of view 410), symbol 408 is displayed. The system of the present invention automatically updates real world frame 530, user frame 510, and display frame 520, such that symbol 408 is updated and tracks the bearing of aircraft 407 in real-time.

Figure 6B:
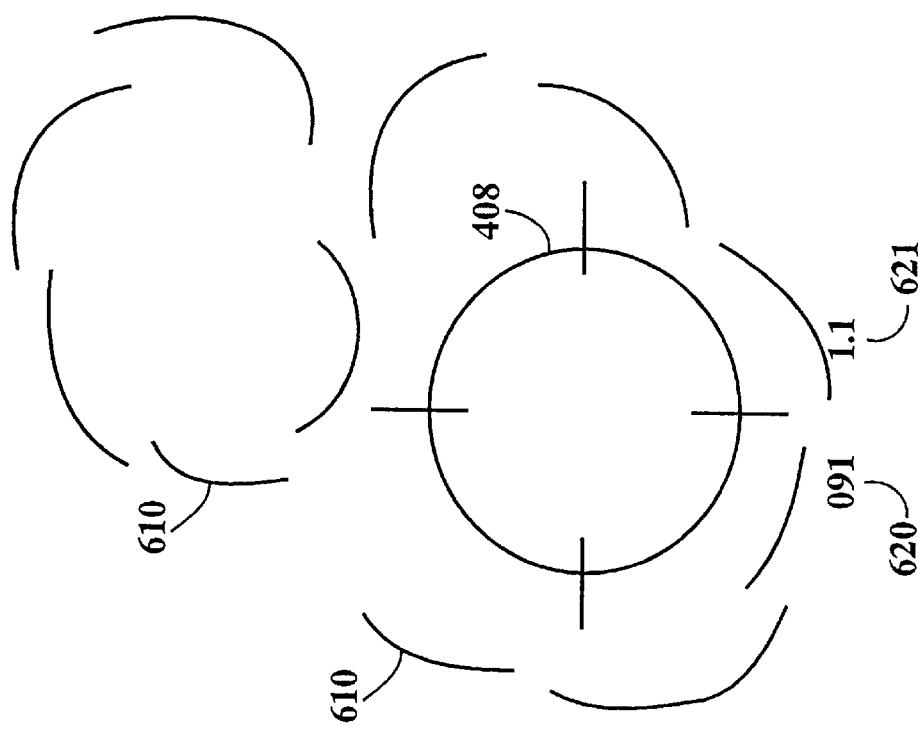
FIG. 6B shows a user's view while wearing one embodiment of the GPS based AR aircraft collision avoidance system of the present invention where the image of the viewed aircraft is obscured by clouds.
Figure 6A:
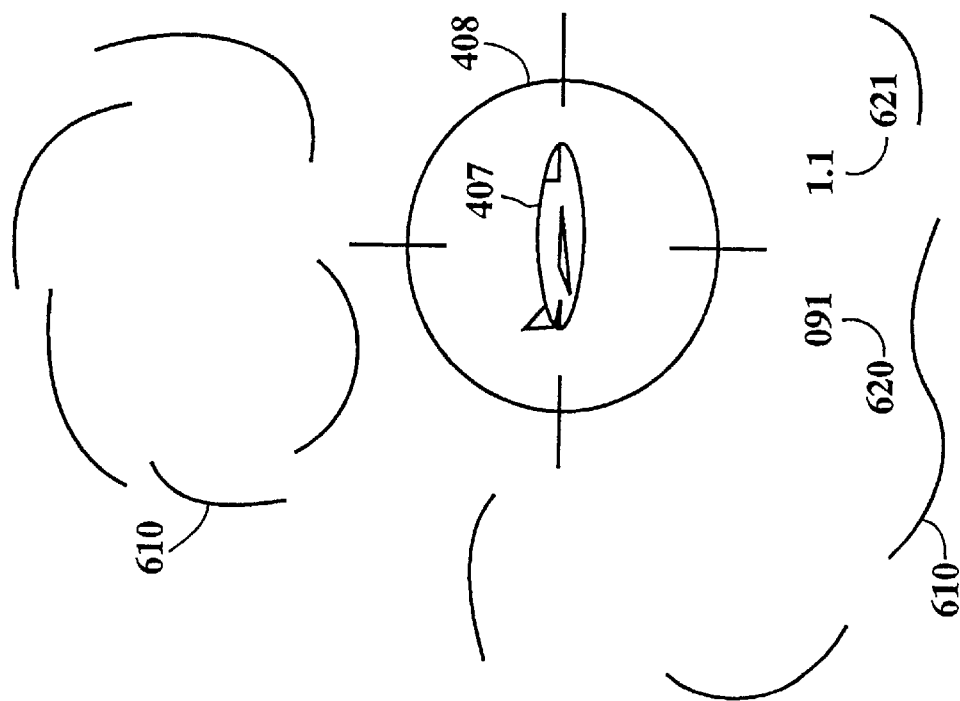
FIG. 6A shows a user's view while wearing one embodiment of the GPS based AR aircraft collision avoidance system of the present invention.

Referring now to FIG. 6A, a user's view (e.g., user 402) while wearing one embodiment of the GPS based AR aircraft collision avoidance system of the present invention is shown. The aircraft 407 is seen with the symbol 408 superimposed in the manner described above. In the present embodiment, symbol 408 is comprised of a circle with a relative bearing 620 on the lower left side (measured in degrees) and a range 621 on the lower right side (measured in nautical miles). Also visible in the field of view are clouds 610.

With reference now to FIG. 6B, a user's view of the image of aircraft 407 obscured by clouds 610 is shown. However, symbol 408 still clearly and intuitively indicates the bearing to aircraft 407. The user is immediately aware that aircraft 407 is within the circle of symbol 408. Range to the aircraft 407 is provided by range 621 and the numerical relative bearing to the aircraft 407 is provided by bearing 620.

Thus, in accordance with the present invention, user 402 is immediately and intuitively aware of the visual bearing, the numerical bearing, and the range of aircraft 407 by merely glancing in its direction. As described above, the real image of aircraft 407 need not actually be visible. For example, aircraft 407 could be relatively small and far away (e.g., 5–6 miles), or aircraft 407 could be obscured by IMC (e.g., fog or clouds). By using a simple visual scan, user is intuitively aware of the location of aircraft 407. It should be appreciated that the configuration and appearance of symbol 408 can vary. Differing symbology (e.g., a cross hair, a hexagon, and the like) as well as differing configurations of numerical data (e.g., relative bearing 620 and range 621) can be readily utilized without departing the scope of the present invention.

In so doing, the present invention provides for air traffic alert and collision avoidance with the accuracy and reliability of GPS and compatibility with current flight regimes (e.g., VFR, IFR, and the like). The symbology displayed by the system of the present invention is visible and easily comprehensible to the user 402 even where neighboring aircraft (e.g., aircraft 407) are obscured, allowing the aircrew to visually cross check air traffic alerts from either GPS squitter avionics or air traffic controller communications regardless of weather conditions. The system of the present invention operates in a hands-free, heads-up manner, allowing the aircrew to remain heads-up, visually scanning the airspace outside the aircraft cockpit.

Figure 6C:
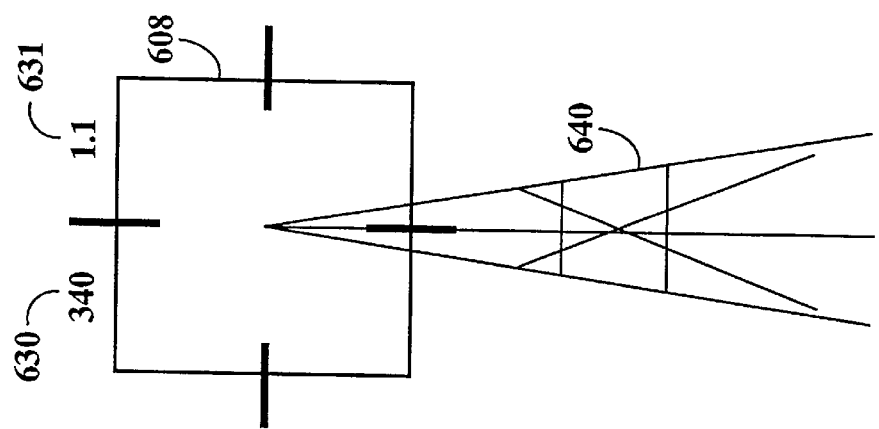
FIG. 6C shows a user's view of a radio transmission tower having a computer generated symbol in accordance with the present invention superimposed.

Referring now to FIG. 6C, a user's view (e.g., user 402) of a radio transmission tower 640 having a symbol 608 superimposed thereon is shown. The system of the present invention is readily adapted to display other real world objects in addition to neighboring aircraft (e.g., aircraft 407). For example, in the case of radio transmission tower 640, the respective GPS coordinates of the top of radio transmission tower 640 can be loaded into a navigation data base maintained within GPS receiver 304 of FIG. 3. Thus, the system of the present invention can indicate the presence of this navigation hazard by superimposing a symbol 608 over the real world image of radio transmission tower 640. Once the system of the present invention is aware of the GPS coordinates (and thus, the real world frame) of radio transmission tower 640, symbol 608 is generated and projected in a manner similar to that described above for aircraft 407. The symbol 608 is different from symbol 408 to indicate to user 402 that the real world object corresponding to symbol 608 is a fixed flight hazard as opposed to a neighboring aircraft. Similarly, relative bearing 630 and range 631 are located in the upper left and upper right respectively, indicating the real world object is fixed to the ground. In addition, as described above, symbol 608 is readily visible to user 402 even though radio transmission tower 640 may be obscured by IMC.

In this manner, the system of the present invention utilizes differing symbols (e.g., symbol 608) to convey information to user 402. For example, differing symbols are utilized to indicate an aircraft on a closing course as opposed to other courses, differing symbols are used to indicate aircraft at close ranges as opposed to long ranges, and differing symbols are used to indicate fixed, ground based flight hazards. The type of symbol and its characteristics are adjustable by the user.

Figure 7B:
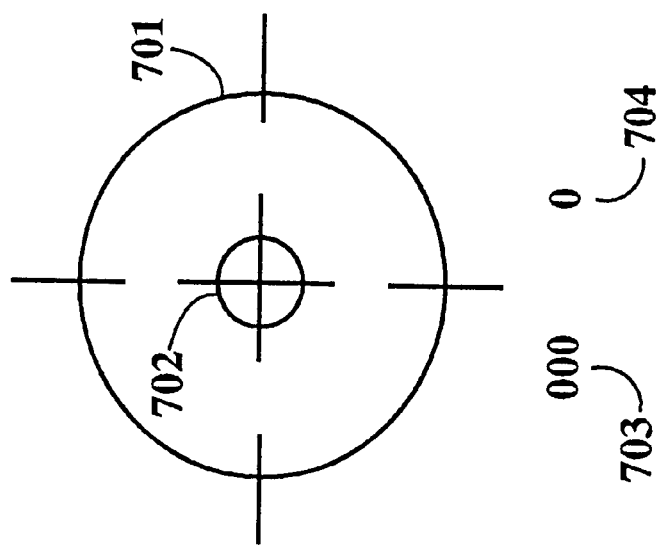
FIG. 7B shows a second portion of the first registration calibration process from FIG. 7A.
Figure 7A:
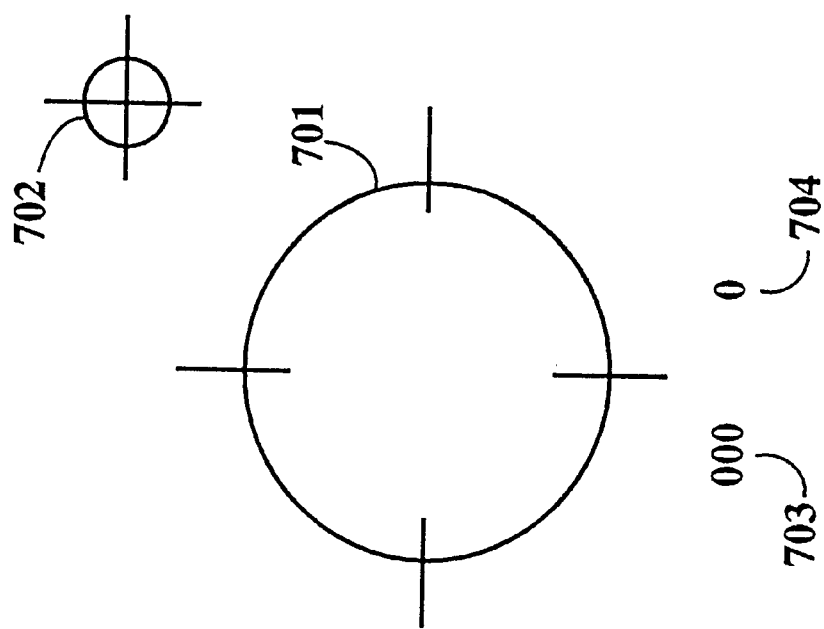
FIG. 7A shows a first portion of a first registration calibration process in accordance with the present invention.

With reference now to FIG. 7A and FIG. 7B, a first registration calibration process in accordance with the present invention is shown. As described above, the system of the present invention needs to ensure the correct alignment of the augmenting computer generated symbology and their corresponding real world images. To finely adjust registration, the system of the present invention includes a calibration mode wherein a symbol 701 is calibrated to properly align with the corresponding real world calibration object 702. The location of the calibration object 702 and the location of user 402 are both known to the system of the present invention (e.g., predetermined and stored in the memory of processor unit 403) thereby fixing the real world frame of calibration object 702. The GPS coordinates and attitude of the aircraft 550 yield the GPS coordinates of both the calibration object 702 and user 402, and thus yield sufficient information to properly calibrate the position sensor 505 of AR visor 401. This process is described in greater detail below.

Figure 7C:
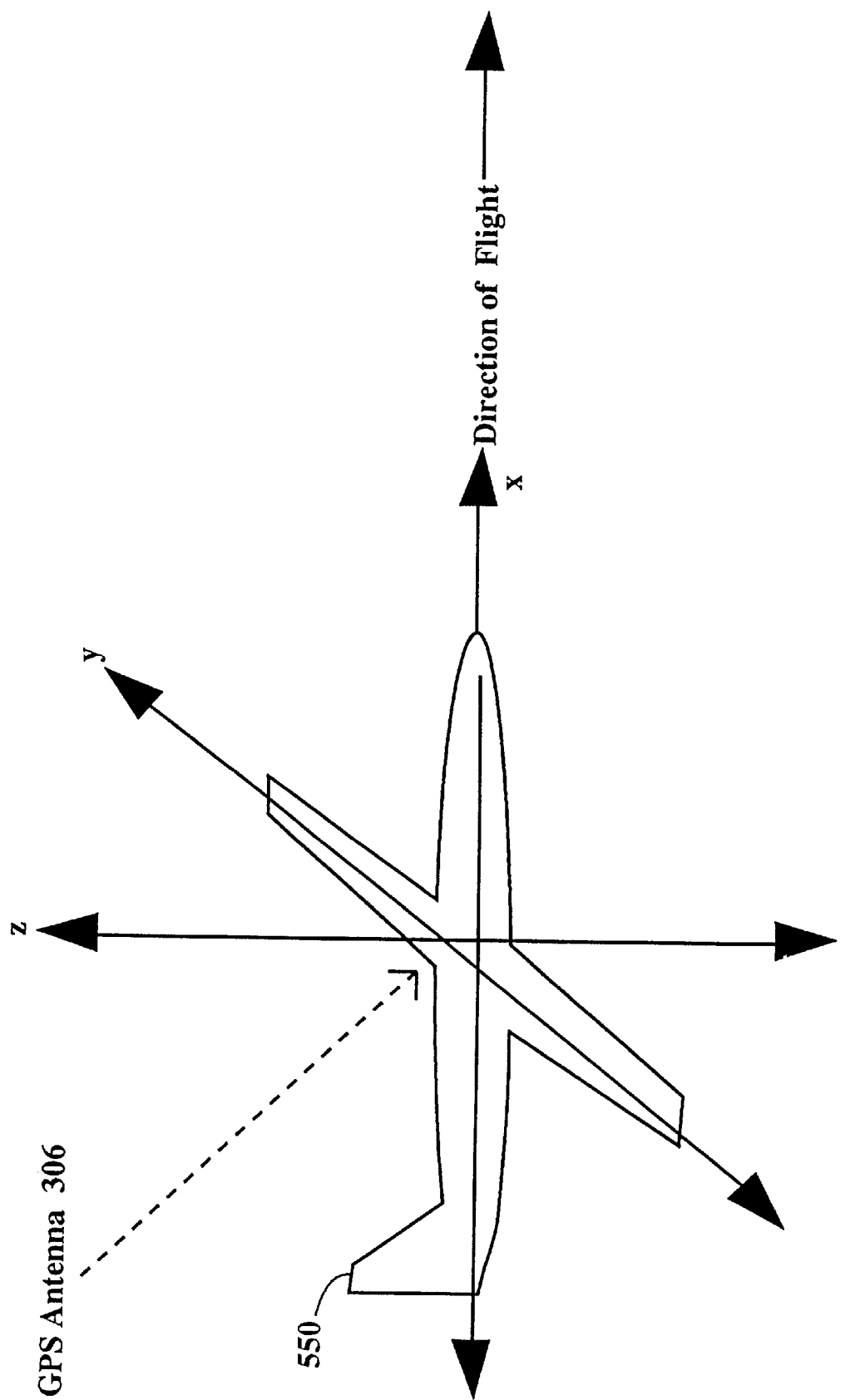
FIG. 7C shows an aircraft aligned with an earth centered earth fixed coordinate system in accordance with the present invention.
Figure 7E:
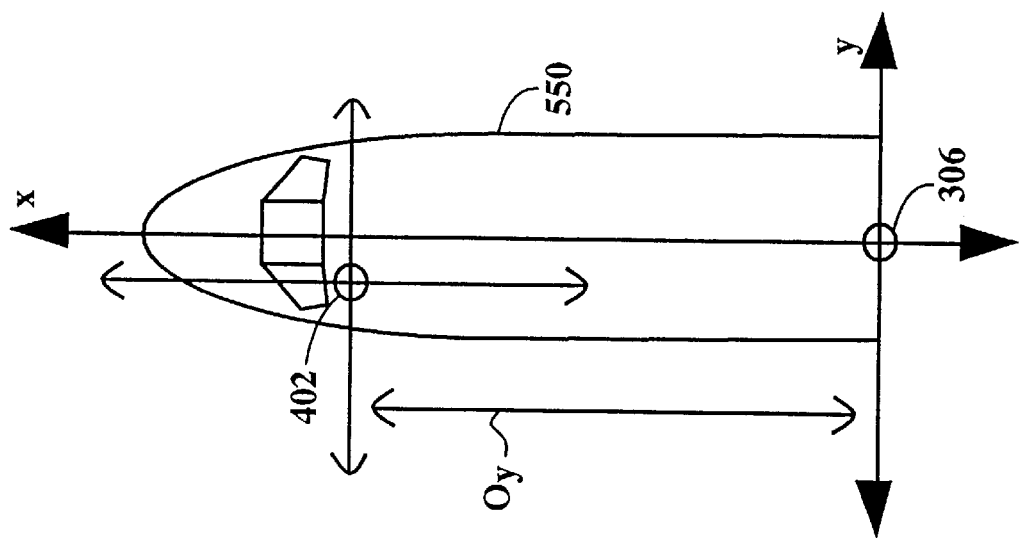
FIG. 7E shows a top plan view of the forward portion of the aircraft from FIG. 7C.
Figure 7D:
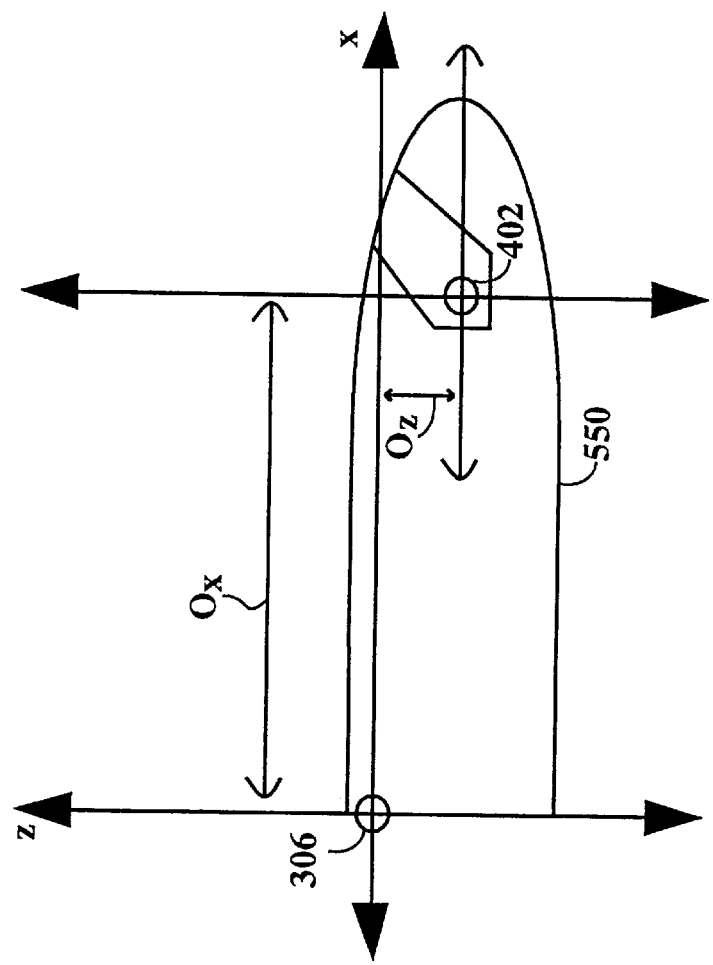
FIG. 7D shows a side view of the forward portion of the aircraft from FIG. 7C.

FIGS. 7C, 7D, and 7E show an alignment process in accordance with the present invention in greater detail. Referring to FIG. 7C, aircraft 550 is shown with respect to an x, y, and z axis of an earth centered earth fixed coordinate system. The direction of flight for aircraft 550 is parallel to the x axis. GPS receiver 304 is contained within aircraft 550 and GPS antenna 306, located as shown, on the top of aircraft 550.

The position of aircraft 550 is determined by GPS receiver 304. GPS receiver 304 references the position of aircraft 550 with respect to an earth centered fixed coordinate system. The earth centered earth fixed (ECEF) coordinate system is well known and widely used in the aviation industry. As such, aviation electronics typically reference position and velocity information with respect to ECEF coordinates (e.g., real world frame 530 from FIG. 5B). Additionally, GPS determined positions are usually defined with respect to the ECEF coordinate system.

In accordance with the present embodiment, aircraft 550 uses GPS receiver 304 to determine its instantaneous present position with respect to the ECEF coordinate system. The velocity and direction of flight is determined through successive GPS position fixes. Since GPS positions are determined via received GPS signals, the resulting positions are actually the positions of GPS antenna 306. The orientation of aircraft 550 with respect to the x, y, and z axis is determined through differential phase measurements of GPS signals received via GPS antenna 306. Differential phase measurement technology functions by accurately determining the attitude of aircraft 550 with respect to the x, y, and z axis of the ECEF coordinate system. Those desiring additional details regarding GPS differential phase measurement for attitude determination are referred to U.S. Pat. No. 5,268,695 "DIFFERENTIAL PHASE MEASUREMENT THROUGH ANTENNA MULTIPLEXING" issued Dec. 7, 1993 to Dentinger, et al., U.S. Pat. No. 5,296,861 "METHOD AND APPARATUS FOR MAXIMUM LIKELIHOOD ESTIMATION DIRECT INTEGER SEARCH IN DIFFERENTIAL CARRIER PHASE ATTITUDE DETERMINATION SYSTEMS" issued Mar. 22, 1994 to Knight, and U.S. Pat. No. 5,561,432 "OUT OF PLANE ANTENNA VECTOR SYSTEM AND METHOD" issued Oct. 1, 1996 to Knight, which are each incorporated herein as background material. Once the position and attitude of aircraft 550 is known, the present invention can determine the position and attitude of user 402.

Referring now to FIG. 7D and FIG. 7E, user 402 is shown with respect to aircraft 550. The instantaneous attitude and position of user 402 with respect to the ECEF coordinate system is determined by combining the position of GPS antenna 306 with an offset describing the location of user 402 with respect to GPS antenna 306. This offset has three components: an x axis component Ox, a y axis component Oy, and a z axis component Oz.

Thus, the ECEF location of user 402 is defined by the equation:

$$\text{User ECEF location} = (Ox, Oy, Oz) + (Ax, Ay, Az)$$

where A is the location of the GPS receiver antenna 306.

Figure 7G:
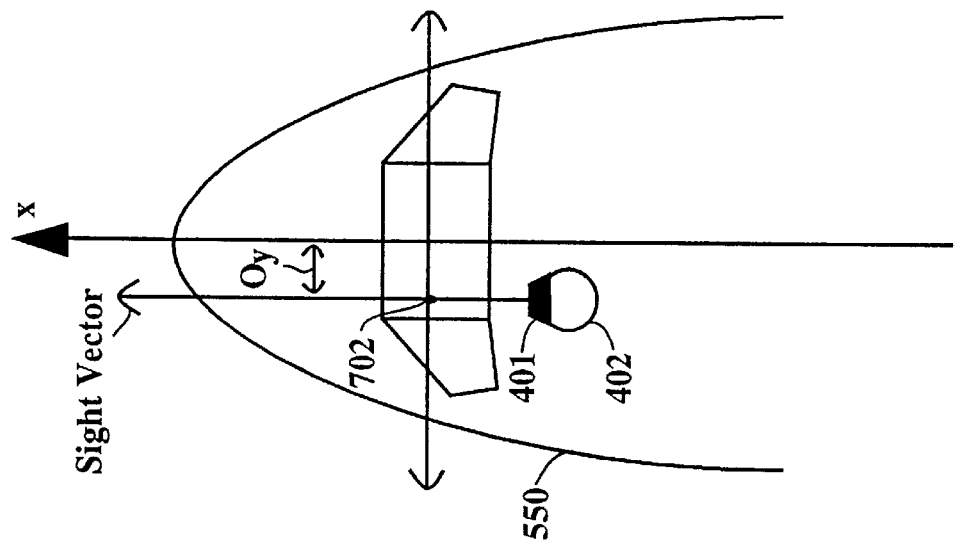
FIG. 7G shows a top plan view of the aircraft from FIG. 7C in greater detail.
Figure 7F:
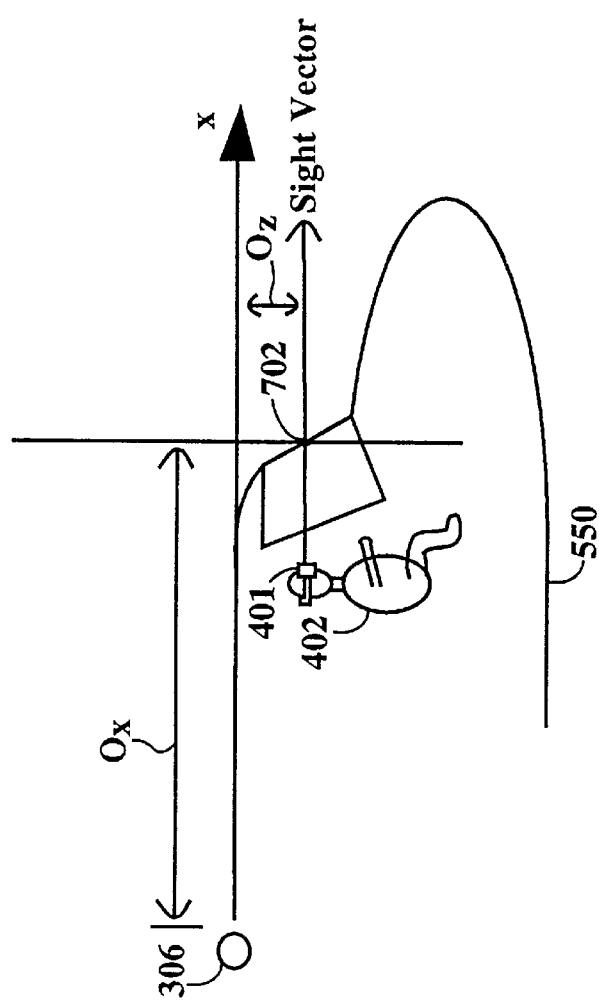
FIG. 7F shows a side view of the aircraft from FIG. 7C in greater detail.

Referring now to FIG. 7F and FIG. 7G a calibration object 702 is shown with respect to aircraft 550. In the present embodiment, calibration object 702 is an inscription on the windshield of aircraft 550. Calibration object 702 is used to align a sight vector with the ECEF coordinate position and attitude of aircraft 550. The instantaneous ECEF attitude and position of calibration object 702 is determined by combining the position of GPS antenna 306 with an offset describing the location of calibration object 702. As with the user offset, the calibration object offset has an x axis component Cx, a y axis component Cy, and a z axis component Cz. Thus, the ECEF location of calibration object 702 is defined by the equation:

$$\text{Calibration object ECEF location} = (Cx, Cy, Cz) + (Ax, Ay, Az)$$

where A is the location of the GPS receiver antenna 306.

Calibration object 702 is located such that the sight vector of user 402 through AR visor 401 is parallel with the x axis. User 402 sits a normal position and looks straight ahead. Adjusting the position of his head, user 402 obtains the sight picture shown in FIG. 7B. When calibration object 702 is properly lined up within symbol 701 (as shown in FIG. 7B), user 402 saves the alignment state of AR visor 401 (e.g., pressing a user input button to save the alignment state). The alignment state is saved within position sensor 505 (shown in FIG. 5B). Consequently, subsequent real world objects seen through AR visor 401 will properly register with their augmenting symbology.

It should be appreciated that the orientation of aircraft 550 can be determined through other avionics means (e.g., aircraft instruments, inertial navigation systems, or the like). As such, the present invention is well suited to the use of differing attitude determination systems. Similarly, while aircraft 550 is described as having a position fixed with respect to an ECEF coordinate system, it should be appreciated that the present invention can function with other coordinate systems.

It should be appreciated that the offsets describing the location of a user and the location of a calibration object with respect to the location of a mounted GPS antenna is aircraft specific. Each aircraft type has its distinct planform and geometric layout. Hence, offsets describing the relative locations of the user and calibration object are specific to the distinct layout and planform of the various aircraft makes and models.

Thus, as described above, when the system of the present invention is properly calibrated, calibration object 702 appears centered within symbol 701, as shown in FIG. 7B. If the system needs calibration, as shown in FIG. 7A, the user 402 manually adjusts the symbol 701 (e.g., by turning his head) until it is properly aligned with the calibration object 702, as shown in FIG. 7B, and cross checks the null value for bearing 703 and range 704. When properly aligned, the user saves the alignment state. In the present embodiment, user input is accepted via a variety of input devices (e.g., buttons, a coupled joy stick, small keyboard, or the like). In the present embodiment, the calibration object 702 is a fixed inscription on the transparent canopy or wind shield of aircraft 550. Using such an inscription, the system of the present invention has a readily available calibration object. However, the system of the present invention also uses other calibration objects.

Referring now to FIG. 7H and FIG. 7I, a second registration calibration process in accordance with the present invention is shown. As described above, the user manually adjusts the symbol 712 until it is properly aligned with the calibration object 711, as shown in FIG. 7I. The user also cross checks the relative bearing 712 and range 713. Hence, when properly calibrated, symbol 710 appears centered over the rotating beacon 711 with the correct relative bearing 712 and range 713. However, in the second registration calibration process, calibration object 711 is a rotating beacon on top of a control tower 715 at an airport. The GPS coordinates of the rotating beacon atop the control tower are known to the system of the present invention. By using an external, distant, real world object as the calibration object, the system of the present invention is able to more finely calibrate and align the user frame and the display frame with the real world frame, in comparison to using an inscription on the windscreen of the aircraft.

Figure 8:
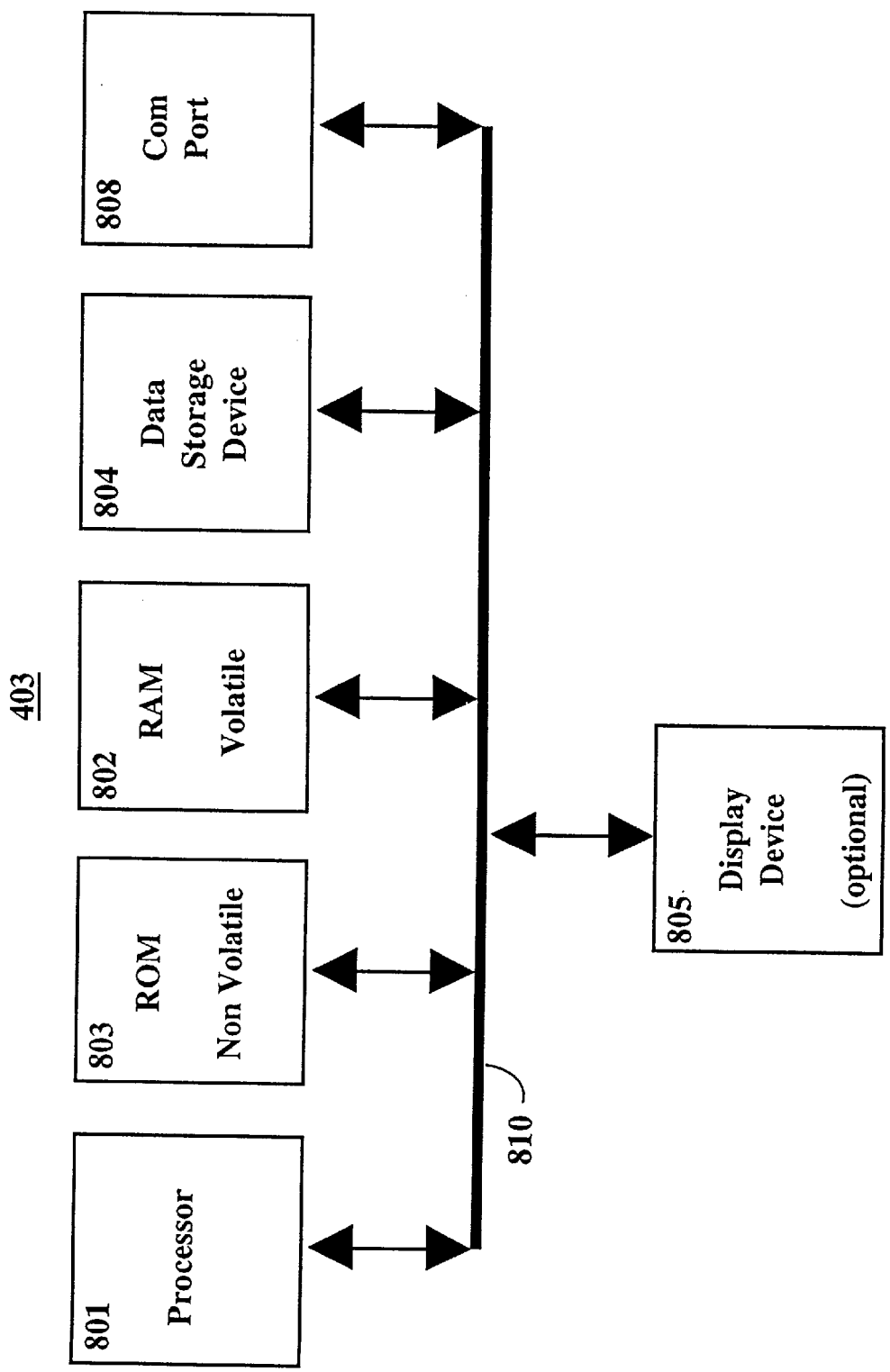
FIG. 8 shows a processor unit in accordance with the system of the present invention in greater detail.

Referring now to FIG. 8, processor unit 403 of the present invention is shown in greater detail. Within the discussions of the present invention, certain processes and steps are discussed (e.g., process 900 of FIG. 9) that are realized, in one embodiment, as a series of instructions (e.g., software program) that reside within computer readable memory units of processor unit 403 and executed by CPU(s) of processor unit 403. When executed, the instructions cause the processor unit 403 to perform specific actions and exhibit specific behavior as described.

In general, processor unit 403 used by the present invention comprises an address/data bus 810 for communicating information, one or more central processing units (CPUs) 801 coupled with the bus 810 for processing information and instructions, a computer readable volatile memory unit 802 (e.g., random access memory, static RAM, dynamic, RAM, etc.) coupled with the bus 810 for storing information and instructions for the CPU(s) 801, a computer readable non-volatile memory unit (e.g., read only memory, programmable ROM, flash memory, EPROM, EEPROM, etc.) coupled with the bus 810 for storing static information and instructions for the CPU(s) 801. Processor unit 203 also includes a mass storage computer readable data storage device 804 (e.g., a magnetic or optical disk and disk drive, a flash memory card, and the like) coupled with the bus 810 for storing information and instructions. A communications port 808 for coupling to external peripheral devices (e.g., GPS receiver 304, ADS-B receiver 405, and AR visor 401) is also coupled to bus 810. An input device 806, including alphanumeric keys, function keys, and a cursor control device, is coupled to bus 810 for communicating information and command selections to the central CPU(s) 801. Optionally, processor unit 403 can include a built in display device 805 coupled to the bus 810 for displaying information to the user.

Figure 9:
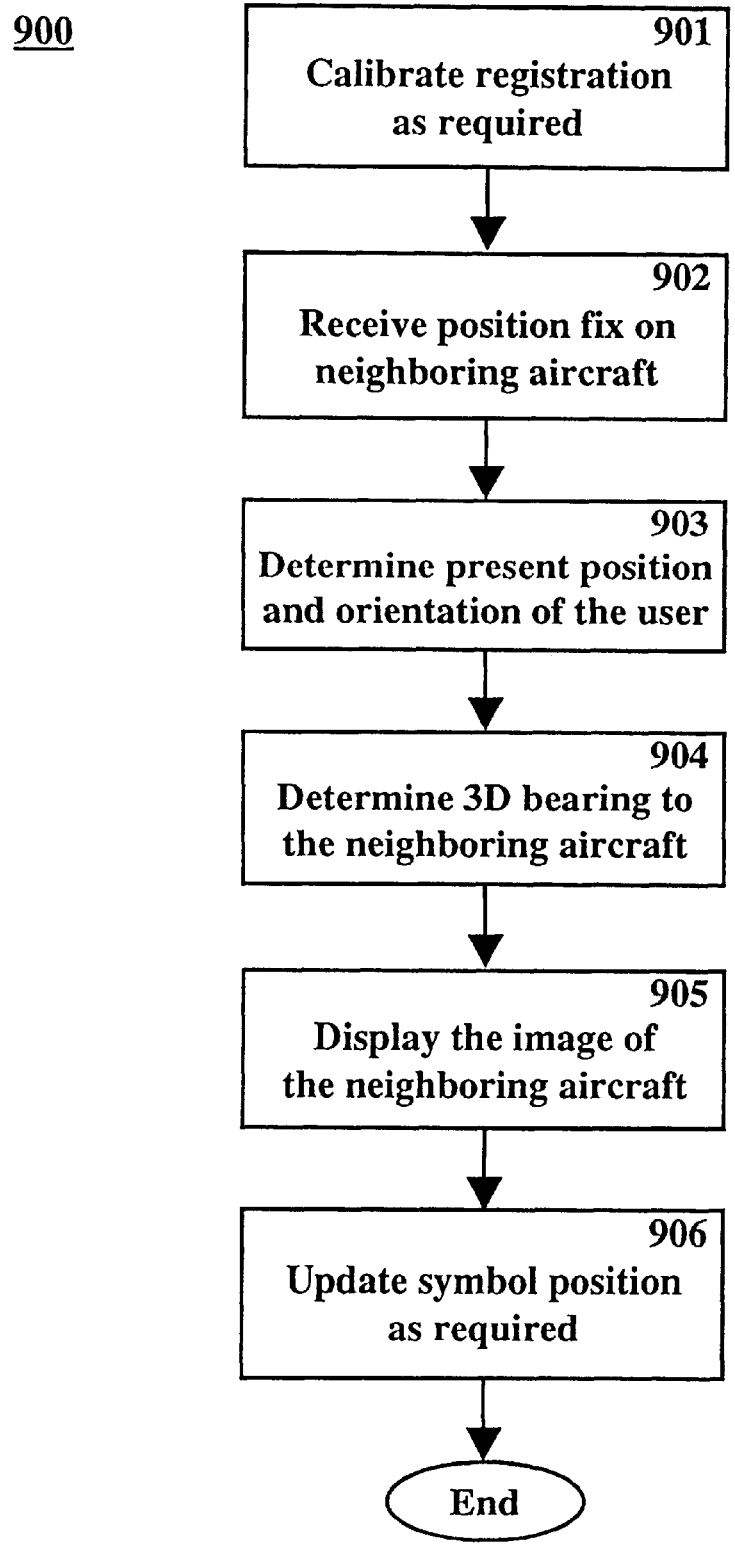
FIG. 9 shows a flowchart of the steps of a process in accordance with one embodiment of the present invention.

With reference now to FIG. 9, a flowchart of a process 900 performed in accordance with one embodiment of the present invention is shown. Process 900 begins in step 901, where the registration of the system of the present invention is calibrated as required. As described above, registration refers to the alignment of the computer generated symbol and the corresponding real world image (e.g., aircraft 407). In the present embodiment, when the system of the present invention needs calibration the user (e.g., user 402) enters the calibration mode of the present invention and manually adjusts the symbol (e.g., symbol 701 shown in FIG. 7A) until it is properly aligned with a calibration object (e.g., calibration object 702 shown in FIG. 7B) in the manner described above. When the user obtains the proper sight picture, the alignment state is saved (e.g., user presses a button on a coupled user input device), thereby aligning the position sensor of the AR visor with the coordinate system of the aircraft. When the system of the present invention is properly calibrated, the calibration object appears centered within the symbol as viewed by the user. As described above, the system of the present invention uses well known coordinate systems (e.g., the ECEF coordinate system) and well known coordinate transform methods to account for the differences between the position and attitude of the user with respect to the position and attitude of the GPS antenna assembly mounted on the aircraft.

In step 902, when the system of the present invention receives a position fix on a neighboring aircraft (e.g., aircraft 407). The neighboring aircraft receives GPS signals from the GPS constellation of FIG. 2 and determines its present position therefrom using well known GPS technology. This position is subsequently broadcast as an ADS-B signal to all ADS-B receivers within range using GPS squitter avionics. The system of the present invention receives the ADS-B signals (via coupled ADS-B receiver 404) and determines the position of the neighboring aircraft therefrom.

In step 903, the system of the present invention determines the present position of the user (e.g., user 402). The system of the present invention receives GPS signals via a coupled GPS receiver (e.g., GPS receiver 304) and determines its present position therefrom. The present position and the position of the neighboring aircraft are both 3D positions.

In step 904, the system of the present invention determines the 3D bearing to the neighboring aircraft. Using the position of the neighboring aircraft and the present position, the 3D bearing to the neighboring aircraft with respect to the user is calculated. The calculations are executed in a processor unit (e.g., processor unit 403) included within the system of the present invention. As described above, the processor unit is coupled to receive the position of the neighboring aircraft from the ADS-B receiver and the user's position from the GPS receiver.

In step 905, a computer generated symbol (e.g., symbol 408) augmenting the image of the neighboring aircraft is displayed to the user. In the manner described above, the system of the present invention aligns the frames of reference of the user, the display visor, and the real world object (i.e., the neighboring aircraft). The position of the neighboring aircraft (e.g., the real world frame) is determined from the ADS-B signals. The user's frame is determined from the user's 3D head orientation and the present position. Using this information, the system of the present invention determines the proper orientation of display frame (e.g., display frame 520 shown in FIG. 5A) and thus, the proper location and orientation of the symbol. As described above, the symbol readily and intuitively indicates the 5D bearing of the neighboring aircraft to the user.

In step 906, the symbol (e.g., symbol 408) is updated as required by the system of the present invention. The processor unit continually receives updates on the user's present position, the position of the neighboring aircraft, and the orientation of the user's head. Using this information, the processor continually updates the frames of reference and continually updates the location of the symbol. As the user's head moves, as the user's present position changes, and as the position of the neighboring aircraft changes, the symbol is continually updated such that it constantly appears superimposed over the neighboring aircraft. In this manner, the symbol indicates the location of the neighboring aircraft even when the neighboring aircraft is obscured by IMC or is too distant to be clearly seen. Additionally, the symbol is updated to indicate whether the neighboring aircraft is on a closing course, the numerical bearing to the neighboring aircraft, the range to the neighboring aircraft, and other information as desired by the user.

Thus, the GPS based AR aircraft collision avoidance system of the present invention provides an air traffic alert and collision avoidance system which has the accuracy and reliability of GPS and is compatible with current flight regimes, such as, for example, flying VFR, flying IFR, and the like. The system of the present invention provides a properly equipped aircrew with a visual and intuitive means of insuring aircraft safe separation. The system of the present invention allows the aircrew to visually cross check air traffic alerts from either GPS squitter avionics or air traffic controller communications. The system of the present invention is fully functional in differing weather conditions, even in flight in full IMC. The system of the present invention functions intuitively and is easily interpreted even during the busiest portions of flight (e.g., take off or landing in heavily congested airspace), thus, allowing the aircrew to remain heads up, visually scanning the airspace outside the aircraft cockpit.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A global positioning system (GPS) based augmented reality (AR) aircraft collision avoidance system comprising:
   a headset adapted to be worn by a user;
   a GPS receiver for receiving GPS signals and determining a position of a user;
   a receiver for receiving a position signal from an object and determining a position of said object therefrom;
   a visor mounted on said headset, said visor adapted to display symbology indicating a bearing to said object such that said user is made aware of said bearing via said symbology, said bearing indicating said position of said object with respect to said position of said user.

2. The system of claim 1, wherein said receiver is an ADS-B (automatic dependent surveillance-broadcast) receiver and said position signal is an ADS-B signal, said ADS-B receiver adapted to determine said position of said object using said ADS-B signal.

3. The system of claim 1, wherein said position signal is a position service broadcast signal describing said position of said object and said receiver is adapted to receive said position service broadcast signal and determine said position of said object therefrom.

4. The system of claim 1, wherein said position signal is a FAA (Federal Aviation Administration) signal describing said position of said object and said receiver is adapted to receive said FAA signal and determine said position of said object therefrom.

5. The system of claim 1 further comprising:
   a processor unit coupled to said visor and said receiver, said processor unit adapted to determine said bearing to said object, said processor unit coupled to transmit said bearing to said visor for display to said user.

6. The system of claim 1 further comprising:
   a position sensor coupled to said visor, said position sensor adapted to determine a orientation of said visor, said orientation, said position of said user, and said position of said object used to display said symbology indicating said bearing to said user.

7. The system of claim 6 wherein said visor is adapted update said symbology such that said symbology indicates said bearing when said user, said object, and said orientation are in motion.

8. The system of claim 1 wherein said symbology includes alphanumeric information indicating an attribute of said object.

9. The system of claim 1 further comprising:
   a user input device for calibrating the registration of said symbology while said symbology is displayed by said visor.

10. A global positioning system (GPS) based augmented reality (AR) aircraft collision avoidance system adapted to be worn by a user while the user is piloting an aircraft, comprising:
    a visor coupled to receive a present position from a GPS receiver, said visor coupled to receive a position of an aircraft from an ADS-B receiver, said visor adapted to determine a 3 dimensional bearing to said aircraft using said present position and said position of said aircraft, said visor adapted to be worn by a user via a headset, said visor adapted to display symbology indicating said 3 dimensional bearing such that said user is made aware of said 3 dimensional bearing via said symbology.

11. The system of claim 10 further comprising:
    a processor unit for determining said 3 dimensional bearing to said aircraft, said processor unit coupled to transmit said 3 dimensional bearing to said visor for display to said user.

12. The system of claim 11 wherein said processor unit calculates said 3 dimensional bearing using said present position and said position of said aircraft.

13. The system of claim 10 wherein said position of said aircraft received from said ADS-B receiver is a 3 dimensional position of said aircraft.

14. The system of claim 10 further comprising:
    a position sensor coupled to said visor, said position sensor adapted to determine a 3 dimensional orientation of said visor, said 3 dimensional orientation, said present position, and said position of said aircraft used to display said symbology indicating said 3 dimensional bearing to said user.

15. The system of claim 14 wherein said visor is adapted update said symbology such that said symbology indicates said 3 dimensional bearing when said user, said aircraft, and said 3 dimensional orientation are in motion.

16. The system of claim 10 wherein said symbology includes alphanumeric information indicating an attribute of said aircraft.

17. The system of claim 10 further comprising:
    a user input device for calibrating the registration of said symbology while said symbology is displayed by said visor to said user.

18. A global positioning system (GPS) based augmented reality (AR) aircraft collision avoidance system comprising:
    a head piece adapted to be worn by a user;
    a GPS receiver for receiving GPS signals and determining a position of a user with respect to said GPS receiver;
    a receiver for receiving a position signal from an object and determining a position of said object therefrom;
    an visor mounted on said head piece, said visor coupled to receive said position of said user from said GPS receiver and coupled to receive said position of said object from said receiver, said visor adapted to display symbology indicating said bearing such that said user is made aware of said bearing via said symbology.

19. The system of claim 18 wherein said head piece is a helmet and said visor is mounted on said helmet.

20. The system of claim 18 wherein said head piece is a hat and said visor is mounted on said hat.

21. The system of claim 18 further comprising:

a position sensor coupled to said visor, said position sensor adapted to determine a orientation of said visor, said orientation, said position of said user, and said position of said object used to display said symbology indicating said bearing to said user.

22. The system of claim 21 wherein the position sensor is attached to said head piece.

23. The system of claim 18, wherein said receiver is an ADS-B (automatic dependent surveillance-broadcast) receiver and said position signal is an ADS-B signal, said ADS-B receiver adapted to determine said position of said object using said ADS-B signal.

24. The system of claim 18, wherein said position signal is a position service broadcast signal describing said position of said object and said receiver is adapted to receive said position service broadcast signal and determine said position of said object therefrom.

25. The system of claim 18, wherein said position signal is a FAA (Federal Aviation Administration) signal describing said position of said object and said receiver is adapted to receive said FAA signal and determine said position of said object therefrom.

26. The system of claim 18 further comprising:

a processor unit coupled to said visor and said receiver, said processor unit adapted to determine said bearing to said object, said processor unit coupled to transmit said bearing to said visor for display to said user.

27. The system of claim 26 wherein said processor unit is integrated into said visor.

28. The system of claim 18 wherein said visor is adapted update said symbology such that said symbology indicates said bearing when said user and said object are in motion.

29. The system of claim 18 further comprising:

a user input device for calibrating the registration of said symbology while said symbology is displayed by said visor.

* * * * *